US007039094B2

(12) United States Patent
Kim et al.

(10) Patent No.: US 7,039,094 B2
(45) Date of Patent: May 2, 2006

(54) ADAPTIVE RAKE RECEIVING APPARATUS CONSTRAINED WITH AT LEAST ONE CONSTRAINT FOR USE IN MOBILE COMMUNICATION SYSTEM AND METHOD THEREFOR

(75) Inventors: Seong Rag Kim, Taejon (KR); Jinho Choi, Taejon (KR); Young-Ho Jung, Busan (KR); Seung Chul Hong, Taejon (KR); Yong Hoon Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 792 days.

(21) Appl. No.: 10/025,797

(22) Filed: Dec. 26, 2001

(65) Prior Publication Data

US 2002/0181554 A1 Dec. 5, 2002

(30) Foreign Application Priority Data

May 3, 2001 (KR) ............................ 2001-24172
Jun. 25, 2001 (KR) ............................ 2001-36184

(51) Int. Cl.
*H04B 1/69* (2006.01)
(52) U.S. Cl. ..................................... 375/147
(58) Field of Classification Search ............... 375/130, 375/142, 163, 150, 152, 144, 148, 136, 147; 370/335, 342, 441, 320
See application file for complete search history.

(56) References Cited

U.S. PATENT DOCUMENTS

| | | | |
|---|---|---|---|
| 5,268,927 A | | 12/1993 | Dimos et al. |
| 5,276,379 A | * | 1/1994 | Haraden et al. ............ 313/493 |
| 5,343,496 A | | 8/1994 | Honig et al. |
| 5,425,059 A | | 6/1995 | Tsujimoto |
| 5,694,388 A | * | 12/1997 | Sawahashi et al. ......... 370/206 |
| 6,069,912 A | * | 5/2000 | Sawahashi et al. ......... 375/142 |

(Continued)

OTHER PUBLICATIONS

Kim, et al.; A Constrained MMSE Receiver . . . ; IEEE Transactions On Communications, vol. 48, No. 11, Nov. 2000, p. 1793-1796.

(Continued)

*Primary Examiner*—Emmanuel Bayard
(74) *Attorney, Agent, or Firm*—Mayer, Brown, Rowe & Maw LLP (57) ABSTRACT

An adaptive RAKE receiving apparatus is constrained with at least one constraint for use in a mobile communication system. The apparatus includes an input signal generator for generating a complex received signal by gathering multi-path components during a corresponding transmitting signature; adaptive filters for filtering the complex received signal based on a tab weight that is adjusted at a predetermined period; channel estimators for estimating a phase component and an amplitude component of a particular user channel by using the filtered signals to generate channel estimating result signals; a signal recovering unit for recovering an original signal, which was transmitted from a particular user, by combining the filtered signals for all multi-path components and the channel estimating result signals; selecting unit for selecting one between a predetermined trained data signal and the recovered signal from the signal recovering unit; a reference signal generator for generating a reference signal by using the selected signal and the channel estimation result signal; an error calculator for comparing the filtered received signal with the reference signal to calculate error between these compared two signals; and a tap coefficient adjuster for adjusting tap coefficients of the adaptive filtering unit based on MMSE (Minimum Mean Square Error) criterion with at least one constraint.

20 Claims, 7 Drawing Sheets

U.S. PATENT DOCUMENTS 6,385,181 B1 * 5/2002 Tsutsui et al. ............... 370/335
6,839,379 B1 * 1/2005 Horng et al. ................ 375/148

OTHER PUBLICATIONS

Lavta-aho, et al.; LMMSE Detection for . . . ; IEEE Transactions on Communications, vol. 48, No. 2., Feb. 2000, p. 194-199.

Barbosa, et al.; Adaptive Detection of . . . ; IEEE Transactions on Communications, vol. 46, No. 1., Jan. 1998, p. 115-124.

Madhow, et al.; *MMSE Interference* . . . ; IEEE Transactions on Communications, vol. 42, No. 12., Dec. 1994, p. 3178-3188.

* cited by examiner

ADAPTIVE RAKE RECEIVING APPARATUS CONSTRAINED WITH AT LEAST ONE CONSTRAINT FOR USE IN MOBILE COMMUNICATION SYSTEM AND METHOD THEREFOR

FIELD OF THE INVENTION

The present invention is related to an adaptive RAKE receiving apparatus constrained with at least one constraint for use in a mobile communication system and a method therefor; and, more particularly, to an adaptive RAKE receiving apparatus constrained with at least one constraint for use in a mobile communication system, for receiving user's data, each of which is spectrally spread by using its corresponding code, and a method therefor.

PRIOR ART OF THE INVENTION

There are disclosed conventional techniques related to a structure of a typical adaptive MMSE (Minimum Mean Square Error) receiver in "MMSE interference suppression for direct-sequence spread-spectrum CDMA," U. Madow and M. L. Honig, IEEE Trans. Commun., vol. 42, pp. 3178–3188, (December 1994) (PAPER1), "Adaptive Detection of DS-CDMA Signals in Fading Channels," S. L. Miller and A. N. Barbosa, IEEE Trans. Commun., vol. 46, no. 1, pp. 115–124, January 1998 (PAPER2), "LMMSE Detection for DS-CDMA System in Fading Channels," M. Latva-aho and M. Juntti, IEEE Trans. Commun., vol. 48, no. 2, pp. 194–199, February 2000 (PAPER3), and "A Constrained MMSE Receiver for DS-CDMA System in Fading Channels," S. R. Kim, Y. G. Jeong, and I. K. Kim, IEEE Trans. Commun., vol. 48, no. 11, pp. 1793–1796, November 2000 (PAPER4).

Hereinafter, it will be described for the structures of the receivers proposed in the above papers and their characteristics.

A typical adaptive MMSE receiver of the PAPER1 shows good performance when channel environment is fixed to have a simple structure but it's performance is abruptly degraded in fading channel environment. This phenomenon results from adaptive filters that cannot adapt themselves for abrupt changes of phase and amplitude of the channel. In order to solve the problem of the typical adaptive MMSE receiver under a frequency flat fading channel, there are proposed receivers having various structures, which compensates for the channel changes by using a separate channel estimation result.

The receivers of the PAPER 2 to PAPER 4 are some modifications for compensating for the channel changes, which use the separate channel estimation result. The performance of the adaptive MMSE receiver depends on accuracy of the channel estimation value. Typically, an adaptive filter output signal has higher SNR (Signal to Noise Ratio) than an adaptive filter input signal. Therefore, the adaptive filter output signal can be used in estimation of the phase and the amplitude of the channel so as to accomplish better performance.

In other words, in the PAPER 2, by compensating the adaptive filter input signal for the phase change component of the channel by estimating the phase change of the channel by using the adaptive filter output signal, load of the adaptive filter is reduced. However, because this scheme only compensates for the phase change of the channel, the performance is degraded when the amplitude change of the channel is significant.

Also, in the PAPER 3, they tried to compensate for both of the phase change and the amplitude change of the channel to improve the performance. However, because of bias of the channel estimation value, the adaptive filter input signal, in which multi-user interference yet exists, rather than the adaptive filter output, is used, which results in channel estimation performance deterioration, which leads little improvement in bit error rate.

Also, in the PAPER 3, for a multi-path fading channel, there are provided a linear MMSE RAKE receiver which includes MMSE adaptive receivers, each for corresponding multi-path component, for estimating and compensating for the phase and the amplitude of the channel by using the adaptive filter input signal. However, because the bias of the channel estimation value is so large that an adaptive filter coefficient converges to zero when the channel estimation is done by using the adaptive filter output signal, the channel estimation should be done by using the adaptive filter input signal. Therefore, in spite of its excellent structure, it does not shows desired performance.

On the other hand, in the PAPER 4 that has been published by the inventors of the present invention, by using a formula for updating a adaptive filter coefficient, there is introduced a constrained MMSE receiver to accomplish an unbiased channel estimation value even if the channel estimation value is obtained by using the adaptive filter output signal in a single path fading channel. However, since it has not addressed a multi-path fading channel, it cannot be applied to real mobile communication environment.

SUMMARY OF THE INVENTION

Therefore, it is an object of the present invention to provide an adaptive RAKE receiving apparatus constrained with at least one constraint for use in a mobile communication system, in which phase and amplitude of each of multi-path component channels can be estimated by using adaptive filter output signals, by applying at least one constraint related to filter coefficients to adaptive filter coefficient updating formula, so as to eliminate all multi-user interference and obtain a good channel estimation value from the adaptive filter output signals.

It is another object of the present invention to provide an adaptive RAKE receiving method, in which phase and amplitude of each of multi-path component channels can be estimated by using adaptive filter output signals, by applying at least one constraint related to filter coefficients to adaptive filter coefficient updating formula, so as to obtain a good channel estimation value.

It is still another object of the present invention to provide a computer readable medium for recording a program for implementing a function for adaptive RAKE receiving, in which phase and amplitude of each of multi-path component channels can be estimated by using adaptive filter output signals, by applying at least one constraint related to filter coefficients to adaptive filter coefficient updating formula, so as to obtain a good channel estimation value.

In accordance with an aspect of the present invention, there is a provided adaptive RAKE receiving apparatus constrained with at least one constraint in a mobile communication system, the apparatus comprising: input signal generating unit for generating a complex received signal by gathering multi-path components during a corresponding transmitting signature; adaptive filtering unit for filtering the complex received signal based on a tab weight vector that is adjusted at a predetermined period; channel estimating unit for estimating a phase component and an amplitude component of a particular user's channel coefficient by using the filtered signal from the adaptive filtering unit to generate a channel estimating result signal; signal recovering unit for recovering an original signal, which was transmitted from a particular user, by combining the filtered signals from the adaptive filter unit for all multi-path components and the channel estimating result signal from the channel estimating unit; selecting unit for selecting one between a predetermined trained data signal and the recovered signal from the signal recovering unit; reference signal generating unit for generating a reference signal by using the selected signal from the selecting unit and the channel estimation result signal from the channel estimating unit; error calculating unit for comparing the filtered received signal from the adaptive filtering unit with the reference signal from the reference signal generating unit to calculate error between these compared two signals; and tap coefficient adjusting unit for adjusting tap coefficients of the adaptive filtering unit based on MMSE (Minimum Mean Square Error) criterion with at least one constraint (constraint MMSE criterion).

In accordance with another aspect of the present invention, there is provided a adaptive RAKE receiving method using at least one constraint in a mobile communication system, the method comprising the steps of: (a) setting initial coefficients of adaptive filters for multi-path components; (b) providing each of the adaptive filters with a desired corresponding multi-path component of a user to perform complex signal filtering; (c) estimating & the complex channel parameter of desired user's each multi-path component; (d) generating a reference signal by determining a transmitted data; (e) calculating an error between the reference signal and the filtered received signal; and (f) updating the coefficients of the adaptive filters based on a constraint MMSE criterion.

In accordance with still another aspect of the present invention, there is provided a computer readable recording medium for recording a program for implementing in mobile communication system for providing with an adaptive RAKE receiving apparatus constrained with at least one constraint and having a microprocessor, the functions of: (a) setting initial coefficients of adaptive filters for multi-path components; (b) providing each of the adaptive filters with a corresponding multi-path component of a user to perform complex signal filtering; (c) determining a channel estimation value for the multi-path component; (d) generating a reference signal by determining a transmitted data; (e) calculating an error between the reference signal and the filtered received signal; and (f) updating the coefficient of the adaptive filters based on a constraint MMSE criterion.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Herein, it is assumed that a pilot channel is transmitted or pilot symbols are periodically transmitted for channel estimation and a spreading code for spectral spreading is a short code of which period is equal to a spreading gain. Further, it is also assumed that the desired user (a targeted user) is the first user.

Further, it is also assumed that a complex valued receiving filter output signal is a signal in unit of chip and an adaptive RAKE receiving apparatus is constrained with at least one constraint regarding filter coefficients. Also, it is assumed that a multi-path component that is received earlier is processed by the adaptive MMSE receiver having a smaller index.

Figure 1:
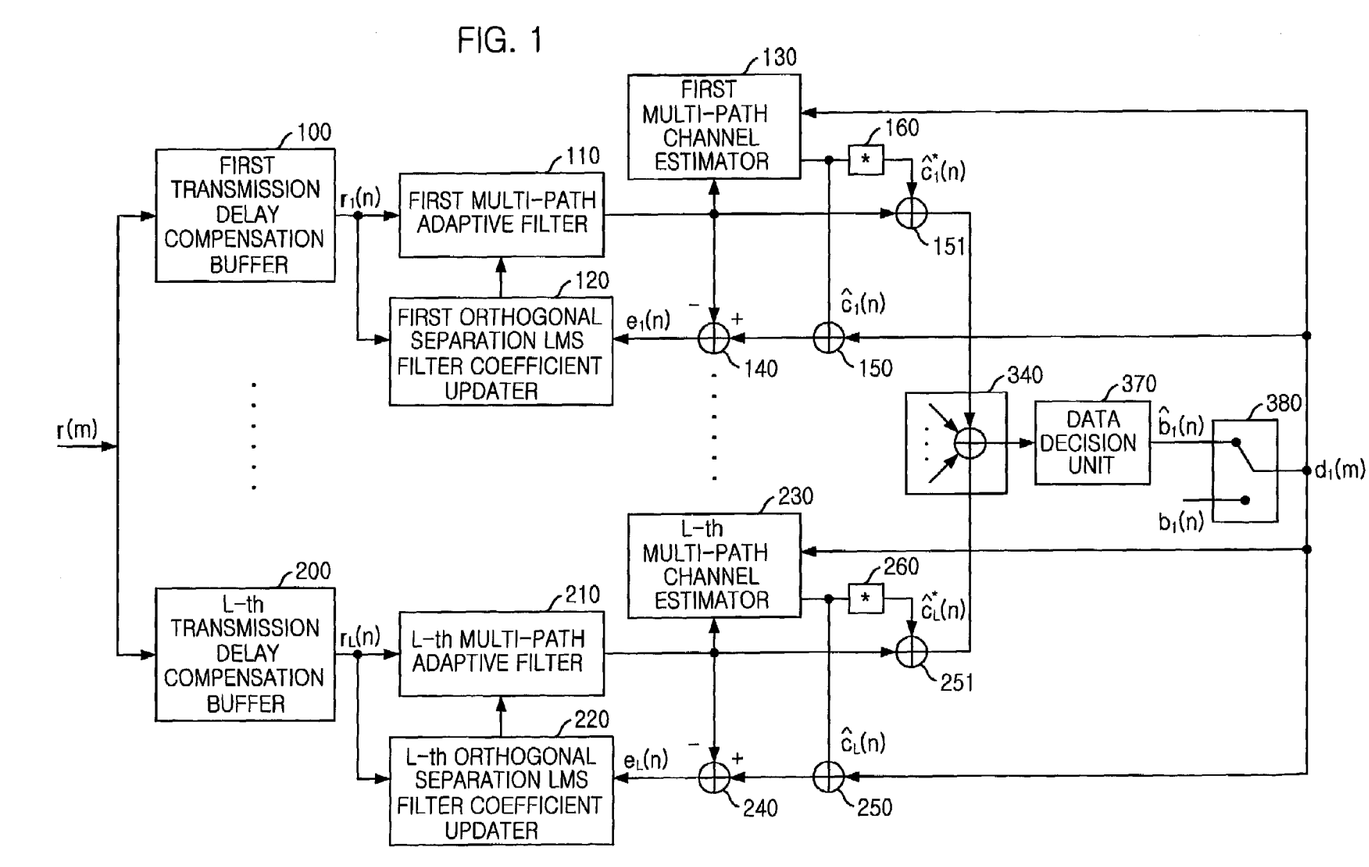
FIG. 1 is a block diagram of the first embodiment of an adaptive RAKE receiving apparatus constrained with at least one constraint in a mobile communication system in accordance with the present invention.

FIG. 1 is a block diagram of the first embodiment of an adaptive RAKE receiving apparatus constrained with at least one constraint for use in a mobile communication system in accordance with the present invention.

In the first embodiment, a constraint where an inner product of a filter coefficient and a corresponding multi-path component is maintained as 1, is applied to a coefficient updating formula for an adaptive filter for each of multi-path components in order to obtain a channel estimation value, that has substantially no bias, from an adaptive filter output signal.

Referring to FIG. 1, the adaptive RAKE receiving apparatus constrained with at least one constraint of the present invention includes transmission delay compensation buffers 100–200, multi-path adaptive filters 110–210, orthogonal separation LMS (Least Mean Square) filter coefficient updaters 120–220, multi-path channel estimators 130–230, a multi-path component combiner 340, a data decision unit 370 and a data selector 380.

The adaptive RAKE receiving apparatus further includes a number of channel estimators 160–260, multipliers and adders.

At first, an output signal r(m) of a receiving filter (not shown), having multi-path components of the desired user, the multi-path components having multi-path transmission delay different from each other, passes through the first to the L-th transmission delay compensation buffers 100–200, each of which compensates the corresponding multi-path transmission delay and provides an N-chip output signal of the receiving filter corresponding to the receiving duration of the corresponding symbol.

Herein, assuming that there are two multi-path components and a relative transmission delay of a lately received (the second) multi-path component is 5 chips relative to the other received (the first) multi-path component, the transmission delay compensation buffers compensate the transmission delays of all multi-path components for a maximum transmission delay.

That is, the transmission delay compensation buffer 100 for the first multi-path component delays the receiving filter output signal by time corresponding to 5 chips and then provides the first adaptive filter 110 with successive N chips of the delayed receiving filter output signal $r_1(n)=[r(m-5) r(m-5) \ldots r(m-5+N-1)]^T$. In this, N×1 vector $r_1(n)$ includes the received signal of N chips corresponding to a duration in which the first multi-path component of the desired user's n-th transmitted data symbol is received.

Similarly, the transmission delay compensation buffer 200 for the second multi-path component provides the second adaptive filter 120 with successive N chips of the non-delayed receiving filter output signal $r_2(n)=[r(m) r(m) \ldots r(m+N-1)]^T$. In this, N×1 vector $r_2(n)$ includes the received signal of N chips corresponding to the duration in which the second multi-path component of the desired user's n-th transmitted data symbol is received.

Herein, the output of the first transmission delay compensation buffer 100 for the first multi-path component is multiplied by a tap coefficient $w_1(n)$ at the first adaptive filter 110. Similarly, the output of the L-th transmission delay compensation buffer 200 for the L-th multi-path component is multiplied by a tap coefficient $w_L(n)$ at the multi-path adaptive filter 210. The tap size of each of the adaptive filters 110–210 is N taps that is equal to the size of the filter input signal vector.

Then, channel estimation is performed for each of the multi-path channels. The channel estimation value is obtained by averaging, during a predetermined period, temporary channel estimation values that are obtained by eliminating data component from the output of each of the multi-path adaptive filters 110–210, respectively, by using pilot symbols.

That is, the average value of the outputs of the l-th adaptive filter for the n-th transmitted symbol is $c_l(n)b_1(n)$+ inter-path interference. Since the inter-path interference is relatively small, the temporary channel estimation value can be obtained by multiplying the complex conjugate of the transmitted symbol, $b_1^*(n)$, that is known from the pilot symbol.

Then, to reduce the effect of noise, the final channel estimation is obtained by averaging the temporal channel estimation values that are obtained by a number of pilot symbols. At this time, the final channel estimation value is as follows:

$$\hat{c}_l = \frac{1}{N_p} \sum_{i=1}^{N_p} b_1^*(n-iQ) w_l^H(n-iQ) r_l(n-iQ) \qquad \text{Eq. 1}$$

where $N_p$ is the number of successive pilot symbols used for the channel estimation and Q is a inserting period of the pilot symbol.

The channel estimator 130 for the first multi-path component separately estimates the channel estimation value for the first multi-path component depending on the above estimation scheme (by using Eq. 1) from the output of the adaptive filter 110 for the first multi-path component and the output of the data selector 380.

Similarly, the channel estimator 230 for the L-th multi-path component estimates the channel parameter for the L-th multi-path component depending on the above estimation scheme in Eq. 1 from the output of the adaptive filter 210 for the L-th multi-path component and the output of the data selector 380.

On the other hand, the filter coefficient of each of the adaptive filters 110–210 are updated at the transmission symbol rate by using the orthogonal separation LMS filter coefficient updaters 120–220 having a number of constraints.

Typically, as an algorithm for changing tap coefficients of the adaptive filters, the LMS algorithm can be used and the tap coefficient of the adaptive filter for the l-th multi-path component is updated by using the conventional LMS algorithm as follows:

$$w_l(n+1) = w_l(n) + \mu[\hat{c}_l(n) d_1(n) - w_l(n)^H r_l(n)]^* r_l(n) \qquad \text{Eq. 2}$$

where $\mu$ the step size at which the tap coefficient of the adaptive filter is changed, $\hat{c}_l(n)$ is the channel estimation value of the l-th multi-path component, and $d_1(n)$ is the output value of the data selector 380 for the n-th transmitted signal of the first user.

Therefore, with adapting the filter coefficient by using this, the filter coefficient is adapted so as to minimize the mean square error as follows:

$$J = E[|\hat{c}_l(n) d_1(n) - w_l(n)^H r_l(n)|^2] \qquad \text{Eq. 3}$$

However, when using the conventional LMS algorithm that estimates the channel by using the adaptive filter output signal as in the receiver of the present invention, the tap coefficients of the multi-path adaptive filters 110–210 converge to zero as in a single path fading channel as in the PAPER4.

To use the conventional LMS algorithm, the input signals to the multi-path channel estimators 130–230 in the structure proposed in the PAPER3 are changed to be the input signals of the multi-path adaptive filters 110–210. However, this structure change degrades the performance of the receiving apparatus.

In the present invention, to solve the above problem of the conventional LMS algorithm, a constraint is applied to the filter coefficient updating formula. This can be referred to an extension of the method of the PAPER4.

$$J = E[|\hat{c}_l(n) d_1(n) - w_l(n)^H r_l(n)|^2] \text{ subject to } w_l(n)^H s_1 = 1 \qquad \text{Eq. 4}$$

where $s_1$ is a normalized spreading code vector and a superscript H represents Hermitian operation.

To implement efficiently the constraint as in Eq. 4, and the tap coefficient $w_l(n)$ of the adaptive filter for the l-th multi-path component, the orthogonal separation scheme is used as follows:

$$w_l(n) = s_1 + x_l(n) \qquad \text{Eq. 5}$$

That is, the inner product of the tap coefficient $w_l(n)$ of the adaptive filter and the spreading code $s_1$ always has 1 i.e., $w_l(n)^H s_1 = 1$, as follows. Here, $\|s_1\|^2$ is 1 since $s_1$ is the normalized spreading code.

$$w_l(n)^H s_1 = (s_1 + x_l(n))^H s_1 = s_1^H s_1 = \|s_1\|^2 = 1 \qquad \text{Eq. 6}$$

From this result, the final filter coefficient updating formula can be expressed by an equation (7) as follows:

$$x_l(n+1) = x_l(n) + \mu \cdot e_l(n)^* \cdot r_{lx}(n) \qquad \text{Eq. 7}$$

where $e_l(n) \equiv \hat{c}_l(n) d_1(n) - w_l(n)^H r_l(n)$ is difference between a product of the channel estimation value and data and the output of the adaptive filter, and $r_{lx}(n) = r_l(n) - s_1^H r_l(n) s_1$ is the component of the received signal $r_l(n)$ projected to the adaptation component $x_l(n)$ of the tap coefficient.

On the other hand, the orthogonal separation LMS filter coefficient updaters 120–220 are provided with the adaptive filter input signal $r_l(n)$ and $e_l(n)$, which is used to update the filter coefficient by using Eq. 7.

The error signal $e_1(n)$ for the first adaptive filter 110 is generated by multiplying the output of the data selector 380 with the channel estimation value $\hat{c}_l(n)$ for the first multi-path component at the multiplier 150 and subtracting the output of the first multi-path adaptive filter 110 from the multiplied values.

The error signal $e_L(n)$ for the L-th adaptive filter 210 is similarly generated by multiplying and subtracting signals.

On the other hand, diversity gain is accomplished by multiplying the output of the multi-path adaptive filter with a weighting value and then summing up the multiplied values. In the present invention, the complex conjugate value of the channel estimation value for each multi-path component is calculated at the corresponding one of the complex conjugate calculators 160–260 and this complex conjugate value is multiplied with the output of the corresponding one of the multi-path adaptive filters 110–210 as a weighing value. The outputs of the multipliers 151–251, i.e., all of the multi-path components, are combined at the multi-path component combiner 340. At this time, Maximum Ratio Combining scheme is employed.

After the energy of all multi-path components is combined at the multi-path combiner 340, transmitted data symbol is decided from the combined output at the data decision unit 370. The data decision unit 370 has its structure as shown in FIG. 5.

Figure 5:
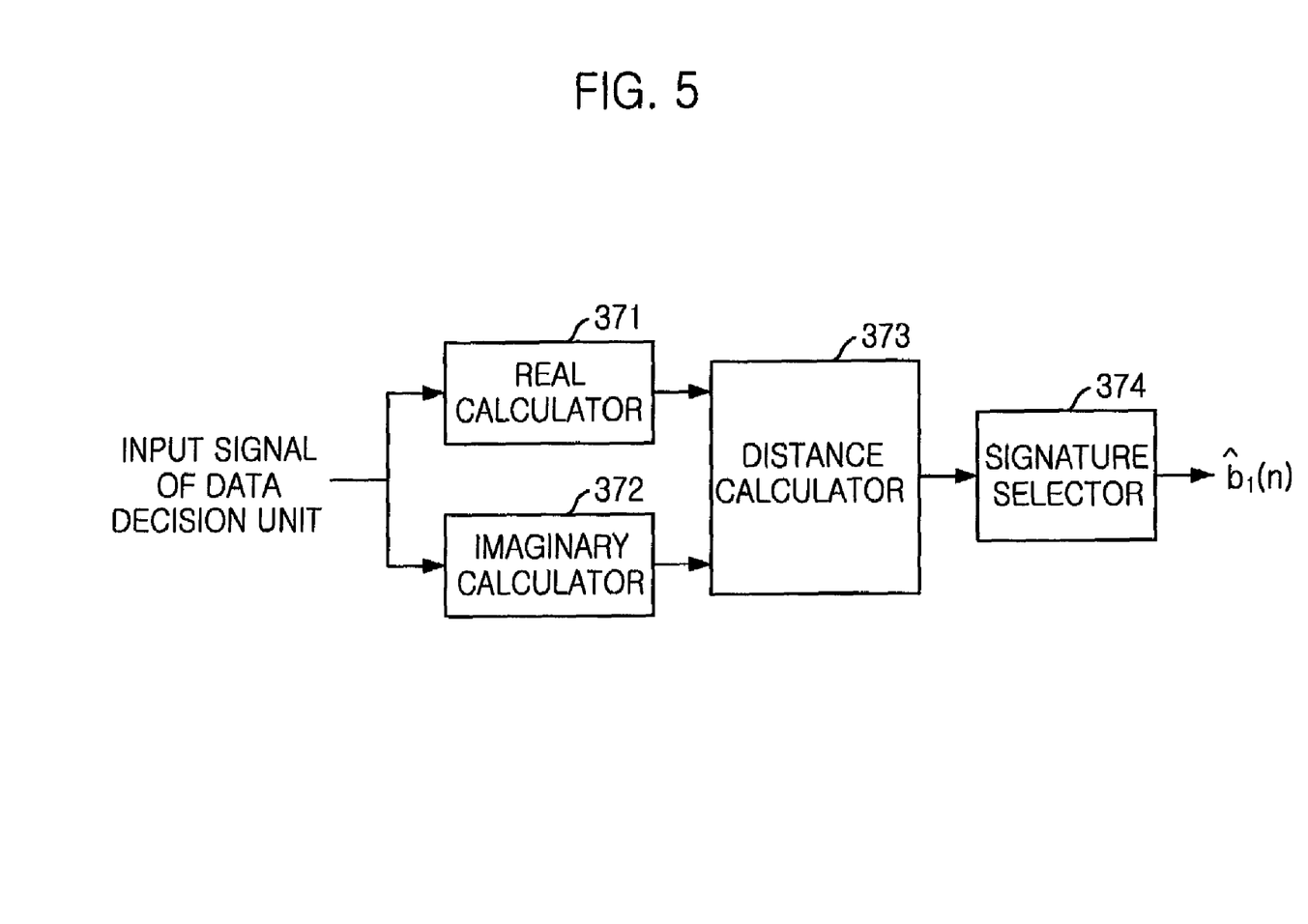
FIG. 5 illustrates a detailed diagram of an embodiment of a data decision unit of a adaptive RAKE receiving apparatus constrained with at least one constraint for use in a mobile communication system in accordance with the present invention.

FIG. 5 illustrates a detailed diagram of an embodiment of a data decision unit of an adaptive RAKE receiving apparatus constrained with at least one constraint for use in a mobile communication system in accordance with the present invention.

As shown in FIG. 5, because the input signal of the data decision unit 340 is a complex signal, this complex signal is divided into its real part and its imaginary part at a real calculator 371 and an imaginary calculator 372, respectively. Then, distances from the complex signal to all of signatures on modulation constellation are obtained at a distance calculator 373. From these distances, a symbol selector 374 decides a symbol that has minimum error and outputs a complex value corresponding to the decided signature.

When BPSK (Binary Phase Shift Keying) is used, because there is data only at the real part and the signature is 1 or −1, the above procedure can be simplified to only taking the real part of the input signal of the data decision unit and determining the signature of the real part.

Typically, in order that the adaptive receiver converges to an optimum solution, the filter coefficient is adapted by training procedure. Because the transmitted signature is known during the training period or pilot transmission period, the data selector 380 selects data $b_1(n)$ regardless of decision of the data decision unit 370. During remaining periods, the data selector 380 selects a decided bit $\hat{b}_1(n)$. Using the pilot symbol that is constantly inserted, as training data, in the present invention, there is no need for additional training data that is unless required for the typical adaptive receiver.

Figure 2:
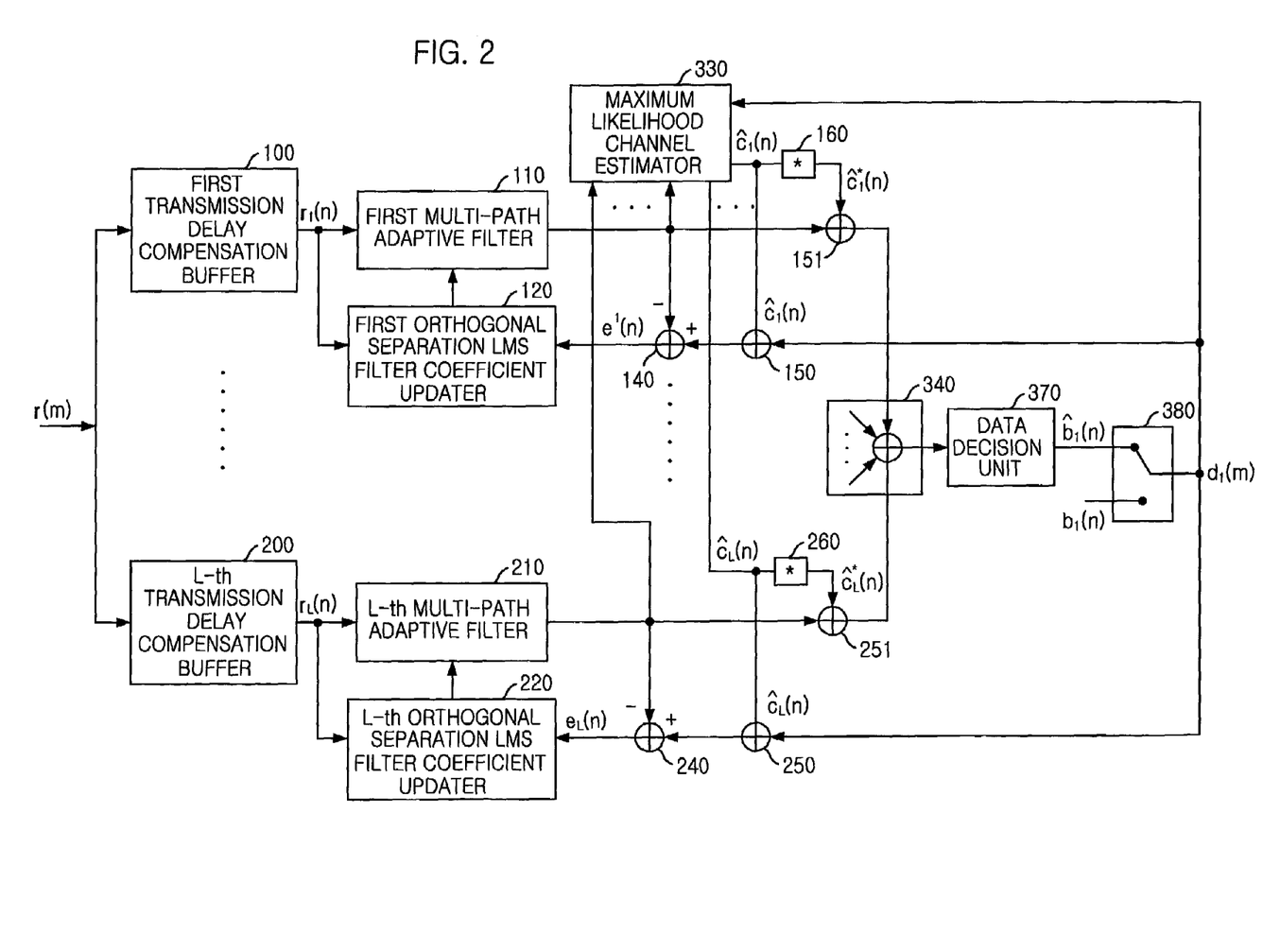
FIG. 2 shows a block diagram of the second embodiment of an adaptive RAKE receiving apparatus constrained with at least one constraint for use in a mobile communication system in accordance with the present invention.

FIG. 2 shows a block diagram of the second embodiment of an adaptive RAKE receiving apparatus constrained with at least one constraint for use in a mobile communication system in accordance with the present invention.

As shown in FIG. 2, the adaptive RAKE receiving apparatus constrained with the constraint of the present invention includes the first to the L-th transmission delay compensation buffers 100–200, the first to the L-th multi-path adaptive filters 110–210, the first to the L-th orthogonal separation LMS filter coefficient updaters 120–220, a maximum likelihood channel estimator 330, a multi-path component combiner 340 and a data selector 380.

The adaptive RAKE receiving apparatus further comprises a number of channel estimators 160–260, multipliers and adders.

In this case, the channel estimation for all of the multi-path components are simultaneously performed at the maximum likelihood estimator 330. The adaptive filter outputs for all of the multi-path components and the output of the data decision unit 380 are inputted to the maximum likelihood channel estimator 330.

Herein, it will be described for a principle of the operation of the maximum likelihood channel estimator 330.

In other words, assuming that the sum of the multi-user interference and noise has Gaussian distribution, the value that is resulted from multiplication the output of each of the L adaptive filters with the conjugate complex of data has Gaussian distribution with a mean as follows:

$$E[b_1^*(n)w_l^H(n)r_l(n)] = \sum_{i=1}^{L} c_i(n)w_l^H(n)s_1(\tau_i - \tau_l) \qquad \text{Eq. 8}$$

where $s_1(p)$ is a p-chip-shifted version of a normalized spreading code $s_1 = [s_{1,1} \ s_{1,2} \ldots s_{1,N-1} \ s_{1,N}]^T$ for the first user, p being an arbitrary integer. When p is a positive integer, $s_1(p)$ can be expressed as follows:

$$s_1(p) = [0_p \ s_{11} \ s_{12} \ldots s_{1,N-p}]^T \qquad \text{Eq. 9}$$

When p is a negative integer, $s_1(p)$ can be expressed as follows:

$$s_1(p) = [s_{1,-p+1} \ s_{1,-p+2} \ldots s_{1,N} \ 0_p]^T \qquad \text{Eq. 10}$$

where $0_p$ is a 1×p 0 vector. $(\tau_i - \tau_l)$ is a transmission delay difference between the i-th multi-path component and the l-th multi-path component and it is assumed to be integer times of a chip. For all of the multi-path components, the maximum likelihood channel estimation value can be obtained, if using the L terms as expressed in Eq. 8, as follows:

$$\begin{bmatrix} \hat{c}_1(n) \\ \vdots \\ \hat{c}_L(n) \end{bmatrix} = \begin{bmatrix} 1 & w_1^H(n)s_1(\tau_2 - \tau_1) & \ldots & w_1^H(n)s_1(\tau_L - \tau_1) \\ \vdots & \vdots & \vdots & \vdots \\ w_L^H(n)s_1(\tau_1 - \tau_L) & w_L^H(n)s_1(\tau_2 - \tau_L) & \ldots & 1 \end{bmatrix}^{-1} \cdot \begin{bmatrix} b_1^*(n)w_1^H(n)r_1(n) \\ \vdots \\ b_1^*(n)w_L^H(n)r_L(n) \end{bmatrix} \qquad \text{Eq. 11}$$

By using a predetermined number of the pilot symbols, the obtained values are averaged. By using this, though unbiased channel estimation values can be obtained simultaneously for all of the multi-path components, calculation complexity increases due to calculation of an inverse matrix, compared with the first embodiment.

Figure 3:
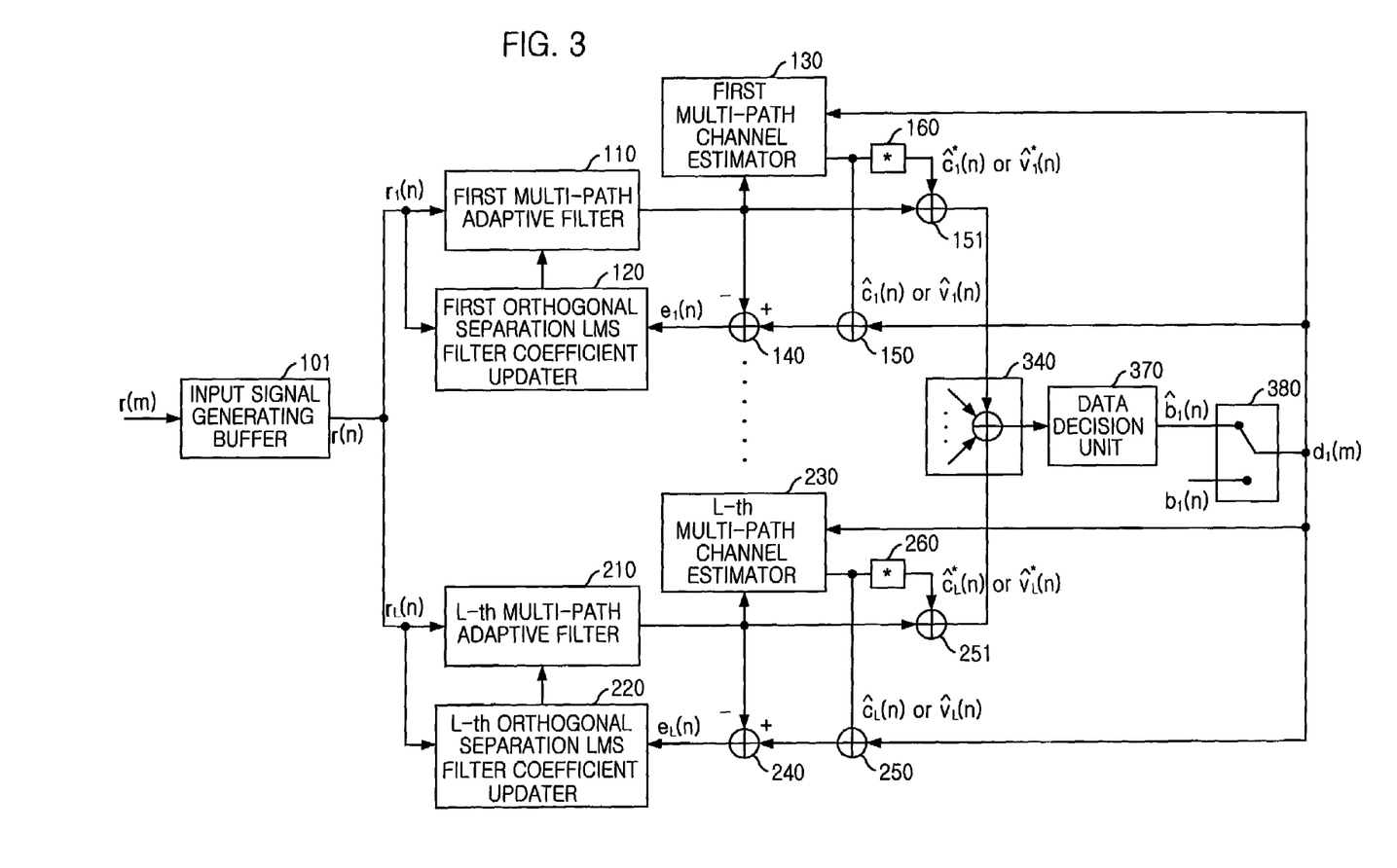
FIG. 3 is a block diagram of the third embodiment of an adaptive RAKE receiving apparatus constrained with at least one constraint for use in a mobile communication system in accordance with the present invention.

FIG. 3 is a block diagram of the third embodiment of an adaptive RAKE receiving apparatus constrained with at least one constraint for use in a mobile communication system in accordance with the present invention.

In the third embodiment, with maintaining the inner product of the filter coefficient and the corresponding multi-path component as 1 in the adaptive filter coefficient updating formula, other constraints such as maintaining the inner product of the filter coefficient and the inter-path interference as 0 are employed to eliminate all of user interference so as to obtain the unbiased channel estimation value from the adaptive filter output.

As shown in FIG. 3, the adaptive RAKE receiving apparatus constrained with multiple constraints of the present invention comprises an input signal generating buffer 101, the first to the L-th multi-path adaptive filters 110–210, a plurality of constraints orthogonal separation LMS filter coefficient updaters 120–220, the first to the L-th multi-path channel estimators 130–230, a multi-path component combiner 340, a data decision unit 370, and a data selector 380.

The adaptive RAKE receiving apparatus further comprises a number of channel estimators 160–260, multipliers, and adders.

The receiving filter output signal r(m) is applied to the input signal generating buffer 101 in order to generate an adaptive filter input signal vector having an adequate form. Offset values for the multi-path components are provided from a searcher that searches the offset values of effective multi-path components in a typical DS-CDMA system.

The input signal generating buffer 101 gathers N+M chips of the received signal from a starting chip of a n-th transmission symbol of the firstly received multi-path component to the final chip of the n-th transmission symbol of the lastly received multi-path component to provide them to each of the adaptive filters.

In other words, taking the firstly received component as a reference, when the output of the received signal corresponding to the starting chip of the n-th transmission symbol is r(nN+1) and maximum difference among the transmission delays is M chips, the output signals of the input signal generating buffer 101, which is a (N+M)×1 vector, for the n-th transmission symbol and the n+1-th transmission symbol are expressed, respectively, as follows:

$$r(n)=[r(nN+1)\ r(nN+2)\ \ldots\ r(nN+N+M)]^T \quad \text{Eq. 12}$$

$$r(n+1)=[r((n+1)N+1)\ r((n+1)N+2)\ \ldots\ r((n+2)N+M)]^T \quad \text{Eq. 13}$$

The output signal r(n) of the input signal generating buffer 101 for the n-th transmitted signal is inputted to each of the multi-path adaptive filters 110–210, in which r(n) is multiplied with the adaptive filter coefficient. When a (N+M)×1 coefficient vector of the l-th adaptive filter is referred to $w_l(n)$, the output of the adaptive filter 110 for the first multi-path component is equal to $w_1^H(n)r(n)$, the output of the adaptive filter for the l-th multi-path component is equal to $w_l^H(n)r(n)$, and the output of the adaptive filter 210 for the L-th multi-path component is equal to $w_L^H(n)r(n)$.

Then, the channel is estimated by averaging, for a predetermined period, the temporal channel estimation values that are obtained by eliminating data component from the outputs of the multi-path adaptive filters 110–210 by using the pilot symbol.

That is, because the average value of the l-th multi-path adaptive filter for the n-th transmitted signature is $c_l b_1(n)$, the temporal channel estimation values can be obtained by multiplication with the complex conjugate $b_1^*(n)$ of the transmitted signature that is known from the pilot symbol.

Then, the final channel estimation value is obtained by averaging the temporal channel estimation values obtained by using a number of the pilot symbols, by using the method in Eq. 1.

The output of the adaptive filter 110 for the first multi-path component and the output of the data selector 380 are applied to the channel estimator 130 for the first multi-path component where the channel estimation value (Eq. 1) for the first multi-path component of the first user is estimated by using those two outputs based on the prescribed estimation method.

Then, similarly, the output of the adaptive filter 210 for the L-th multi-path component and the output of the data selector 380 are applied to the channel estimator 230 for the L-th multi-path component where the channel estimation value is separately estimated by using Eq. 1.

On the other hand, the filter coefficients of the adaptive filters 110–210 are updated at a transmitted signature rate by using the plural-constraints orthogonal separation LMS filter coefficient updaters 120–220.

The algorithm for the plural-constraints orthogonal separation LMS filter coefficient updaters can be implemented in two ways.

Firstly, several parameters and operators are defined before description of the algorithm.

$$S=[s_{l1}\ s_{l2}\ \ldots\ s_{lL}] \quad \text{Eq. 14}$$

$$P_A^\perp = I - A(A^H A)^{-1} A^H \quad \text{Eq. 15}$$

Eq. 14 is an N×L matrix including the spreading codes of the targeted users for the multi-path components. Each of the column vectors is defined as the same as in Eq. 7. Eq. 15 is an N×N orthogonal complementary projector. When any N×L matrix is multiplied with Eq. 15, the component of the multiplied matrix, orthogonal to all column vectors of the A matrix is obtained.

In the first structure for implementing the algorithm, the filter coefficient of the adaptive filter 110 for the l-th multi-path component converges so as to minimize following Eq. 16.

$$J \equiv E\lfloor |\hat{c}_l(n)d_1(n) - w_l(n)^H r(n)|^2 \rfloor \text{ subject to } w_l(n) = \bar{s}_{1l} + x_l(n) \text{ and } x_l(n) \perp \text{Range}(S), \text{ where } \bar{s}_l = S(S^H S)^{-1} f_l. \quad \text{Eq. 16}$$

In Eq. 16, $f_l$ is a L-by-1 column vector with all elements 0's except 1 at the l-th position. In considering the constraints, because $x_l(n)$ is orthogonal to the spreading code for the l-th multi-path component as well as other multi-path components, the bias of the channel estimation due to the multi-path interference is eliminated. Adaptation algorithm to minimize Eq. 16 is obtained by following Eq. 17.

$$x_l(n+1) = x_l(n) + \mu \cdot e_l(n)^* \cdot P_S^\perp r(n) \quad \text{Eq. 17}$$

where $e_l(n) \equiv \hat{c}_l(n)d_1(n) - w_l(n)^H r(n)$, i.e., the difference between the product of the channel estimation value and data and the output of the adaptive filter, and $P_S^\perp = I - S(S^H S)^{-1} S^H$. In case that the channel estimation is performed in Eq. 1, the unbiased channel estimation value can be obtained so that performance is improved.

$$E[\hat{c}_l] = E\left[\frac{1}{N_p}\sum_{i=1}^{N_p} b_1^*(n-iQ)w_l^H(n-iQ)r(n-iQ)\right]$$

$$= E\left[\frac{1}{N_p}\sum_{i=1}^{N_p} b_1^*(n-iQ)(\bar{s}_{1l} + x_l(n-iQ))^H r(n-iQ)\right]$$

$$= E\left[\frac{1}{N_p}\sum_{i=1}^{N_p} (\bar{s}_{1l} + x_l(n-iQ))^H \cdot \sum_{l=1}^{L} c_l s_{1l}\right]$$

$$= c_l$$

Eq. 18

By adapting the filters based on the plural-constraints orthogonal separation LMS filter coefficient updating algorithm, i.e., multiplying the filter output with the complex conjugate of the estimation value of a corresponding channel component, the product of the energy of the correspond multi-path component and data is generated. At the data combiner 340, this product is added to other products of the energy of other multi-path components and data to obtain the estimation value for the transmitted data of the targeted user.

A vector of data component in a Range(S) spanned by L spreading code vectors (a sum of all of the multi-path components), each code vector corresponding to each multi-path component, can be considered as a linear sum of each spreading code vector as a basis. The series of receiving procedures can be considered as a procedure for obtaining weighting values for each basis by using the multi-path adaptive filters.

If the signal component in a same Range is expressed by using the L bases rather than by the spreading code, a new plural constraints orthogonal separation LMS filter coefficient updating algorithm that is completely equivalent to the former algorithm can be derived.

By constructing an N×L matrix $U=[u_{11}\ u_{12}\ \ldots\ u_{1L}]$ with L left singular vectors of S by singular value decomposition of the code matrix S, the range spanned by U is completely identical to the range spanned by S and column vectors are orthogonal to each other. Therefore, the signal of the targeted user that is a sum of multi-path components can be expressed as a linear summation of column vectors of U as bases.

In this case, if Eq. 19 is satisfied and the channel is estimated by the method of Eq. 1 by using the filter output, $v_l(n)$ is estimated rather than the multi-path component. Therefore, the outputs of the channel estimators 130–230 are expressed as follows:

$$Sc(n)=Uv(n) \qquad \text{Eq. 19}$$

where $v(n)=U^H Sc(n)$.

Based on this, Eq. 16 can be expressed as follows:

$$J=E[|\hat{v}_l(n)d_1(n)-w_l(n)^H r(n)|^2] \text{ subject to } w_l(n)=u_{1l}+z_l(n) \text{ and } z_l(n) \perp \text{Range } (U) \qquad \text{Eq. 20}$$

Further, using this, the filter updating formula is obtained as follows:

$$z_l(n+1)=z_l(n)+\mu \cdot e_l(n)^* \cdot P_U^\perp r(n) \qquad \text{Eq. 21}$$

where $e_l(n) \equiv \hat{v}_l(n)d_1(n)-w_l(n)^H r(n)$, i.e., the difference between the product of the channel estimation value and data and the output of the adaptive filter, and $P_U^\perp = I-U(U^H U)^{-1} U^H = I-UU^H$.

As described above, the adaptive filter input signal r(n) and error signal $e_l(n)$ are applied to the plural-constraints orthogonal separation LMS filter coefficient updating algorithm blocks 120–220 where the filter coefficient is updated by using Eq. 17 or Eq. 21.

The error signal $e_l(n)$ for the first adaptive filter is generated by multiplying 150 the output of the data selector 380 with the channel estimation value for the first multi-path component $\hat{c}_1(n)$ (in Eq. 20, $\hat{v}_1(n)$ )and subtracting the output signal of the adaptive filter 110 for the first multi-path component from the multiplied value.

Similarly, the error signal $e_L(n)$ of the L-th adaptive filter is generated by the multiplier 250 and the adder 240.

On the other hand, diversity benefit can be obtained from multiplying an adequate weighting value with the output signal of the adaptive filter for each of the multi-path components and adding the weighted output signal. In the present invention, after the complex conjugates of the channel estimation values for multi-path components are obtained at the complex conjugate calculators 160–260, the complex conjugates are multiplied with the outputs of the multi-path adaptive filters 110–210 by the multipliers 151–251, respectively. The outputs of the multipliers 151–251, i.e., all of the multi-path components, are summed up by the multi-path component combiner 340 by employing maximum ratio combination scheme.

Then, the energy of all of the multi-path components summed up at the multi-path component combiner 340 and then transmitted data symbol is temporally decided by the data decision unit 370.

Figure 4:
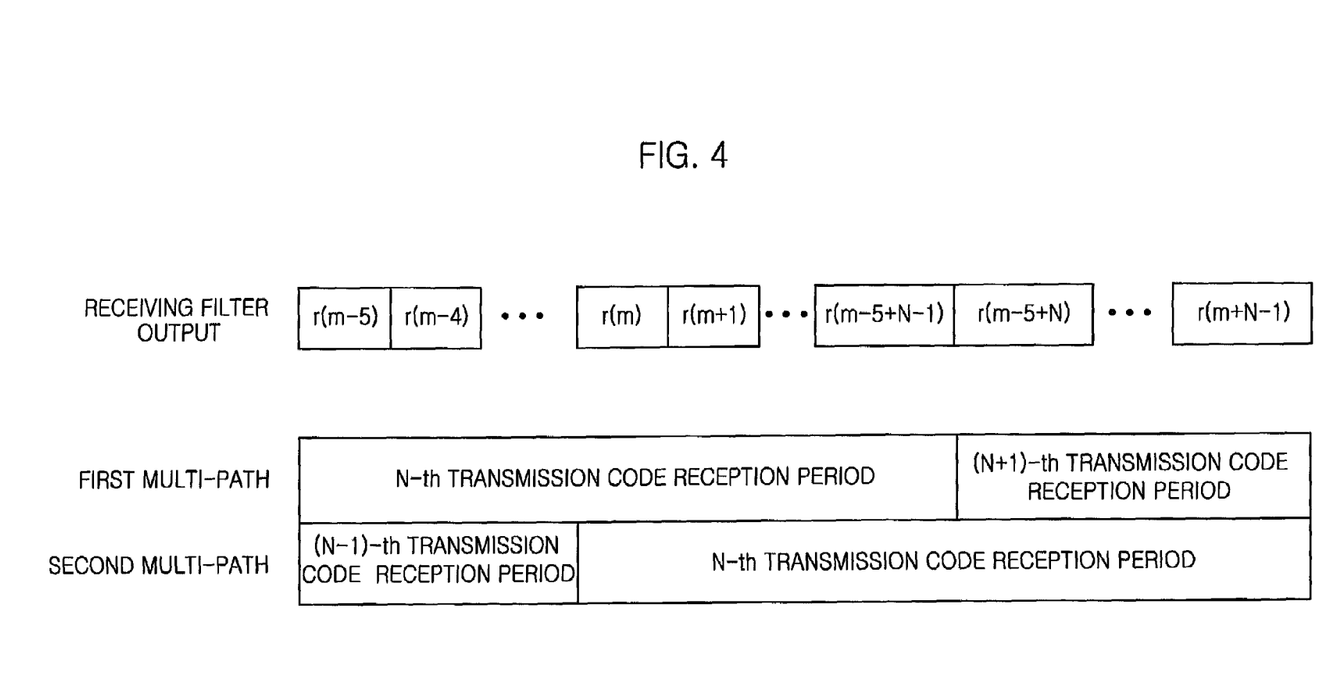
FIG. 4 provides a diagram for showing configuration of a receiver input signal including a number of multi-path components in accordance with the present invention.

FIG. 4 provides a diagram for showing configuration of a receiver input signal including a number of multi-path components in accordance with the present invention.

Figure 6:
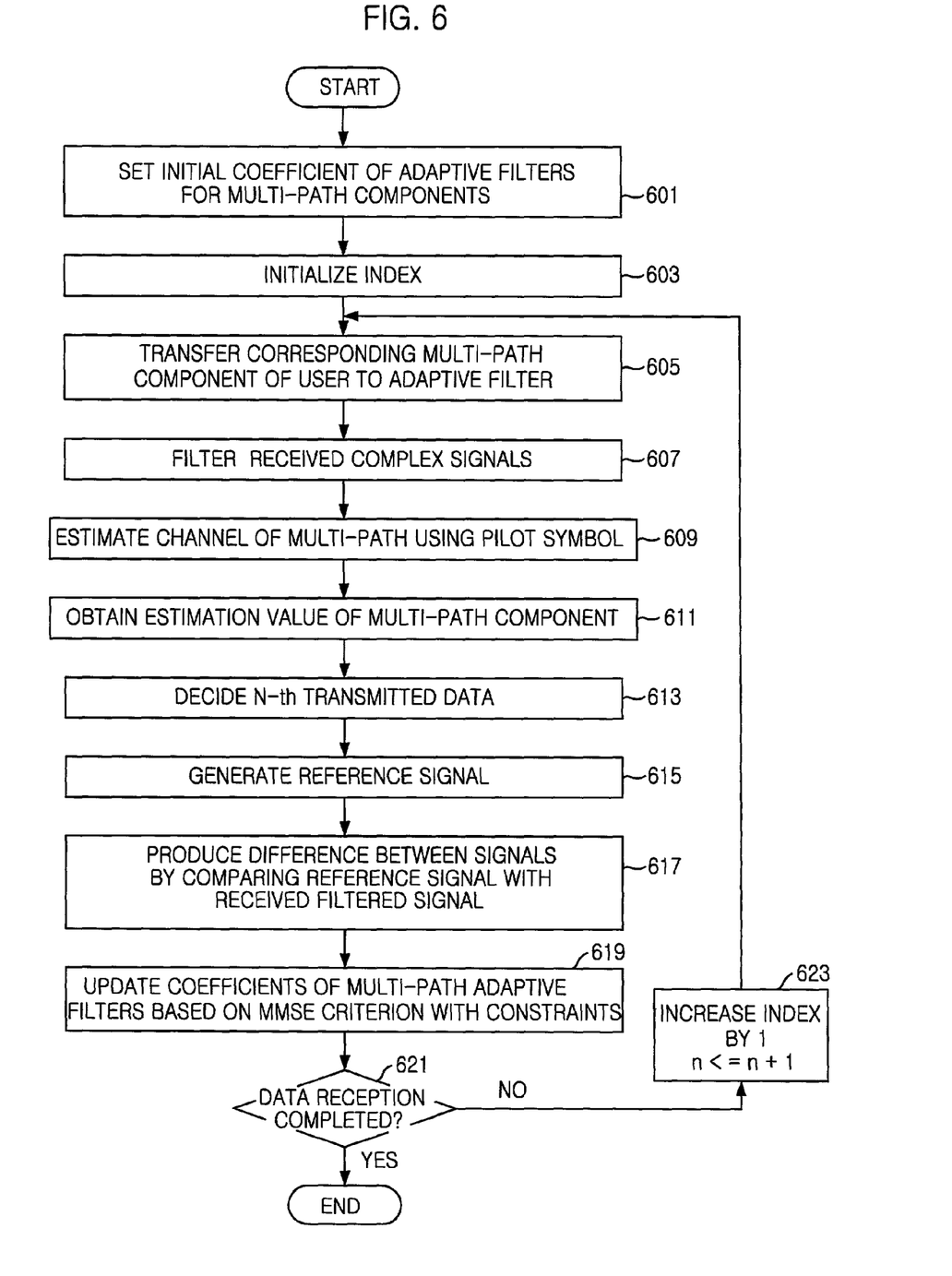
FIG. 6 offers a flow chart for an embodiment of an adaptive RAKE receiving method using at least one constraint for use in a mobile communication system in accordance with the present invention.

FIG. 6 offers a flow chart for an embodiment of an adaptive RAKE receiving method using one constraint for use in a mobile communication system in accordance with the present invention.

As shown in FIG. 6, the adaptive RAKE receiving apparatus constrained with at least constraints of the present invention sets 601 the initial coefficient of each of the adaptive filters for the L multi-path components as the spreading code of the corresponding multi-path component and initializes the index n to 1.

The spreading code is $s_1$ in the first and the second embodiments and $S_{1l}$ in the third embodiment.

The adaptive RAKE receiving apparatus of the present invention transfers 605 the corresponding multi-path component of the user to the adaptive filter. In the first and the second embodiments, at the transmission delay buffers 100–200, transmission delays of the multi-path components are compensated to gather the received signals during the transmitted symbol period and apply the gathered signals to the adaptive filter. In the third embodiment, at the input signal generating buffer 101, the received signals corresponding to the starting chip of the multi-path component that is firstly received among the multi-path components to the final chip of the multi-path component that is lastly received are gathered 607 to apply to the adaptive filters, respectively.

The channel of each multi-path is estimated in 609 by averaging, during a predetermined period, the temporal channel estimation values which are obtained by eliminating the data component from the outputs of the adaptive filters 110–210 for the multi-path components, respectively, by using the pilot symbol. In the first and the third embodiments, the channels are estimated at the multi-path channel estimators. In the second embodiment, the multi-path channels are estimated at the maximum likelihood channel estimators.

The soft decision value for the transmitted signal is obtained in 611 by multiplying the complex conjugate of the channel estimation values with the outputs of the adaptive filter, respectively, and summing up the multiplied values for all of the multi-path components.

Then, after the n-th transmitted data is decided in 613, the reference signal is generated 615 by using the decided data and the channel estimation value.

Then, the difference between the signals is produced 617 by comparing the reference signal with the filtered received signal and the coefficients of the multi-path adaptive filters are updated 619 based on the MMSE criterion with at least constraints.

Upon completing data reception, the adaptive RAKE receiving method of the present invention is ended, whereas the initialized index is increased 621 to repeat the above procedure while data reception continues.

Figure 7:
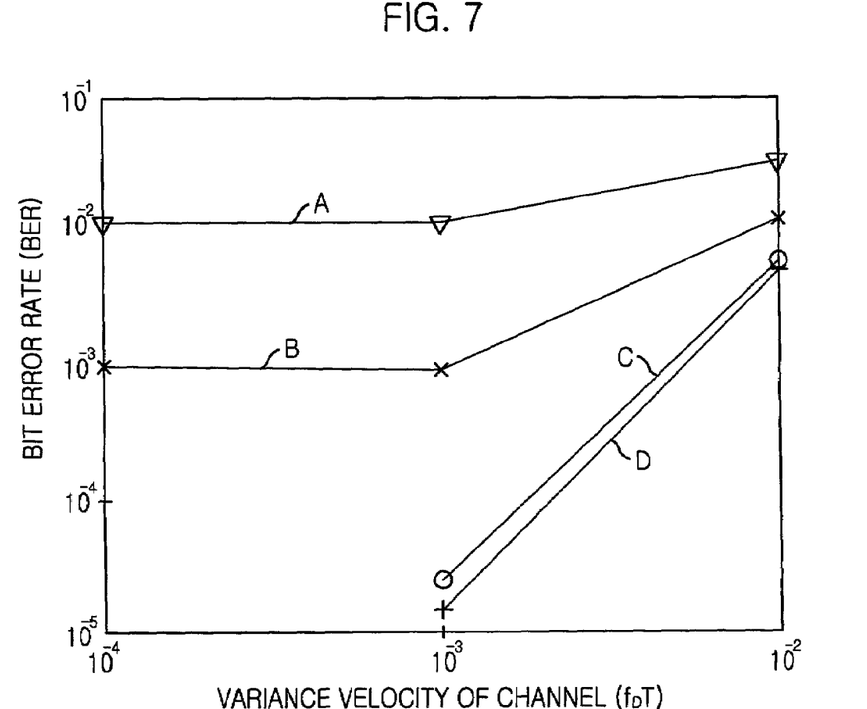
FIG. 7 shows a graph for bit error performance of an adaptive RAKE receiving apparatus constrained with at least one constraint for use in a mobile communication system in accordance with the present invention.

FIG. 7 shows a graph for bit error performance of an adaptive RAKE receiving apparatus constrained with at least one constraint for use in a mobile communication system in accordance with the present invention.

That is, FIG. 7 illustrates a simulation result for explaining good data detection performance of the present invention. Herein, for the simulation environment, it is assumed that the channel is a Rayleigh Fading channel having 3 multi-paths, the number of the users having same transmission power is 5, Gold code having its period of 31 is used as the spreading code, and fading change rate expressed by a product of Doppler frequency $f_D$ and signature period T, i.e., $f_D T$ is a value from $10^{-4}$ to $10^{-2}$.

In FIG. 7, a reference character A represents the conventional RAKE receiver, a reference character B represents the adaptive MMSE receiver as in PAPER 3, a reference character C represents the first embodiment of the present invention, and a reference character D represents the second and third embodiment of the present invention.

As described above, the method of the present invention may be implemented in a program to be stored at a computer readable recording medium such as CD ROMs, RAMs, ROMs, floppy disks, hard disks and magneto-optical disks.

As described above, the present invention may be applied to a CDMA receiver so that data detection performance and quality of service are improved and high speed operation is available. Also, service area of a base station is enlarged in the multi-path fading channel environment, than the conventional RAKE receiver or other adaptive MMSE receivers which have been developed for the multi-path fading channel.

Further, since the multi-user interference is eliminated in the present invention, there is no need for strict power control.

On the other hand, the present invention requires only information for the targeted user (the spreading code, synchronization information) whereas information for all users are required in the conventional interference eliminator. Therefore, the present invention may be also applied to a mobile terminal as well as the base station.

While the present invention has been shown and described with respect to the particular embodiments, it will be apparent to those skilled in the art that many changes and modifications may be made without departing from the spirit and scope of the invention as defined in the appended claims.

What is claimed is:

1. An adaptive RAKE receiving apparatus constrained with at least one constraint in a mobile communication system, the apparatus comprising:

input signal generating means for generating a complex received signal by gathering multi-path components during a corresponding transmitting signature;

adaptive filtering means for filtering the complex received signal based on a tab weight that is adjusted at a predetermined period;

channel estimating means for estimating a phase component and an amplitude component of a particular user channel by using the filtered signal from the adaptive filtering means to generate a channel estimating result signal;

signal recovering means for recovering an original signal, which was transmitted from a particular user, by combining the filtered signals from the adaptive filter means for all multi-path components and the channel estimating result signal from the channel estimating means;

selecting means for selecting one between a predetermined trained data signal and the recovered signal from the signal recovering means;

reference signal generating means for generating a reference signal by using the selected signal from the selecting means and the channel estimation result signal from the channel estimating means;

error calculating means for comparing the filtered received signal from the adaptive filtering means with the reference signal from the reference signal generating means to calculate error between these compared two signals; and tap coefficient adjusting means for adjusting tap coefficients of the adaptive filtering means based on MMSE (Minimum Mean Square Error) criterion with at least one constraint (constraint MMSE criterion).

2. The receiver as recited in claim 1, wherein the constraint MMSE criterion is defined as:

$$J = E\lfloor |\hat{c}_l(n)d_1(n) - w_l(n)^H r_l(n)|^2 \rfloor \text{ subject to } w_l(n)^H s_1 = 1$$

where J is the constraint MMSE criterion, E represents a mean value, $\hat{c}_l(n)$ is an estimated channel for the l-th multi-path component, $d_1(n)$ is the selected signal from the selecting means, $w_l(n)$ is an adaptive filter coefficient vector, and a superscript H represents Hermitian operation, and a product of the tap coefficient $w_l(n)$ of the adaptive filtering means and a spread code vector $s_1$ is constrained to be substantially 1 so that the error calculated at the error calculating means is minimized.

3. The receiver as recited in claim 2, wherein the tap coefficient of the adaptive filtering means for the l-th multi-path component is orthogonal-separated into a spreading code vector and an adaptive component orthogonal to the spreading code vector expressed as:

$$w_l(n) = s_1 + x_l(n)$$

where $s_1$ is the spreading code vector and $x_l(n)$ is the adaptive component of the tap coefficient vector, these two vectors being orthogonal to each other, the adaptive component orthogonal to the spreading code vector is changed by using a component of the received signal, which is projected into the adaptive component orthogonal to the spreading code vector rather than using directly the received signal.

4. The receiver as recited in claim 1, wherein the constraint MMSE criterion is defined as:

$$J = E\lfloor |\hat{v}_l(n)d_1(n) - w_l(n)^H r(n)|^2 \rfloor \text{ subject to } w_l(n) = u_{1l} + z_l$$
$$(n) \text{ and } z_l(n) \perp \text{Range}(U)$$

where J is the constraint MMSE criterion, E represents a mean value, $\hat{c}_l(n)$ is an estimated channel for the l-th multi-path component, $d_1(n)$ is the output signal from the selecting means, $w_l(n)$ is an adaptive filter coefficient vector, and a superscript H represents Hermitian operation, the inner product of the tap coefficient $w_l(n)$ of the adaptive filtering means for the l-th multi-path component and the spreading code vector $s_{1l}$ for the corresponding multi-path component is constrained to be substantially 1 and the inner product of the tap coefficient $w_l(n)$ of the adaptive filtering means for the l-th multi-path component and the spreading code vector $s_{1l}$ ($l \neq 1$) for other corresponding multi-path component is constrained to be substantially 0 so that the error that is calculated by the error calculating means is minimized.

5. The receiver as recited in claim 4, wherein the tap coefficient of the adaptive filter means for the l-th multi-path component is orthogonal-separated into a spreading code vector and an adaptive component orthogonal to the spreading code vector as:

$$w_l(n) = \bar{s}_{1l} + x_l(n)$$

where $\bar{s}_{1l} = S(S^H S)^{-1} f_l$, $f_l$ is a L-by-1 column vector with all elements 0's except 1 at the l-th position and $x_l(n)$ is the adaptive component of the tap coefficient vector, $x_l(n)$ being orthogonal to a range spanned by S, i.e., $x_l(n) \perp \text{Range}(S)$, the adaptive component orthogonal to the spreading code vector is changed by using a component of the received signal, which is projected into the adaptive component orthogonal to the spreading code vector rather than using directly the received signal.

6. The receiver as recited in claim 2, wherein the constraint MMSE criterion for updating the coefficient of the adaptive filtering means for the l-th multi-path component is implemented by orthogonal separation LMS (least mean square) algorithm as:

$$x_l(n+1) = x_l(n) + \mu \cdot e_l(n)^* \cdot P_S^\perp r(n)$$

where $e_l(n) \equiv \hat{c}_l(n) d_1(n) - w_l(n)^H r(n)$, i.e., the difference between the product of the channel estimation value and data and the output of the adaptive filtering means, and $P_S^\perp = I - S(S^H S)^{-1} S^H$, $P_S^\perp r(n)$ being a component of $r(n)$ projected into $x_l(n)$, $\mu$ is a step size that determines the rate at which the tap coefficient changes, and a superscript * represents complex conjugate operation.

7. The receiver as recited in claim 1, wherein, in order to estimate the channel for the l-th multi-path component, the channel estimating means multiplies the outputs of the adaptive filtering means for the multi-path components with the complex conjugate of data for a predetermined number of the pilot symbol and averages the multiplied results as follows:

$$\hat{c}_l = \frac{1}{N_p} \sum_{i=1}^{N_p} b_1^*(n - iQ) w_l^H(n - iQ) r_l(n - iQ)$$

where $N_p$ is the number of the pilot symbols used for the channel estimation and Q is an inserting period of the pilot symbol.

8. The receiver as recited in claim 1, where the constraint MMSE criterion is defined as:

$$J \equiv E[|\hat{v}_l(n) d_1(n) - w_l(n)^H r(n)|^2] \text{ subject to } w_l(n) = u_{1l} + z_l(n) \text{ and } z_l(n) \perp \text{Range}(U)$$

where J is the constraint MMSE criterion, E represents a mean value, $\hat{v}_l(n)$ is a coefficient estimated by the l-th basis component, $d_1(n)$, is the output of the selected means, $z_l(n)$ is a variable component of an adaptive filter coefficient, $r(n)$ is an adaptive filter input signal vector, $U = [u_{11} \, u_{12} \, \ldots \, u_{1L}]$ is a matrix constructed by L left singular vectors of $S = [s_{11} \, s_{12} \, \ldots \, s_{1L}]$ and a superscript H represents Hermitian operation, the inner product of the tap coefficient $w_l(n)$ of the adaptive filtering means for the l-th multi-path component and the spreading code vector $s_{1l}$ for the corresponding multi-path component is constrained to be substantially 1 and the inner product of the tap coefficient $w_l(n)$ of the adaptive filtering means for the l-th multi-path component and the spreading code vector $s_{1l}$ ($l \neq 1$) for other multi-path components is constrained to be substantially 0 so that the error that is calculated by the error calculating means is minimized.

9. The receiver as recited in claim 8, wherein the tap coefficient of the adaptive filtering means for the l-th multi-path component is orthogonal-separated into a spreading code vector and an adaptive component orthogonal to the spreading code vector as:

$$w_l(n) = u_{1l} + z_l(n)$$

where $u_{1l}$ is the l-th left singular vector of the spreading code matrix S and $z_l(n)$ is the adaptive component of the tap coefficient vector, $z_l(n)$ being orthogonal to the range spanned by U, i.e., $z_l(n) \perp \text{Range}(U)$, the adaptive component orthogonal to the spreading code vector is changed by using a component of the received signal, which is projected into the adaptive component orthogonal to the spreading code vector rather than using directly the received signal.

10. The receiver as recited in claim 8, wherein the constraint MMSE criterion for updating the coefficient of the adaptive filtering means for the l-th multi-path component is implemented by orthogonal separation LMS (least mean algorithm) expressed as:

$$z_l(n+1) = z_l(n) + \mu \cdot e_l(n)^* \cdot P_U^\perp r(n)$$

where $e_l(n) \equiv \hat{v}_l(n) d_1(n) - w_l(n)^H r(n)$, i.e., the difference between the product of the channel estimation and data and the output of the adaptive filtering means, $P_U^\perp = I - U(U^H U)^{-1} U^H = I - U U^H$, $P_U^\perp r(n)$ is a component of $r(n)$ projected to $z_l(n)$, $\mu$ is a step size that is a rate at which the tap coefficient is changed, and a superscript * represents complex conjugate operation.

11. The receiver as recited in claim 1, wherein, in order to estimate the channel for the l-th multi-path component, the channel estimating means multiplies the outputs of the adaptive filtering means for the multi-path components with the complex conjugate of data for a predetermined number of the pilot symbol and averages the multiplied values by an equation expressed as:

$$\hat{v}_l = \frac{1}{N_p} \sum_{i=1}^{N_p} b_1^*(n - iQ) w_l^H(n - iQ) r(n - iQ)$$

where $N_p$ is the number of the pilot symbols used for the channel estimation and Q is an inserting period of the pilot symbol.

12. The receiver as recited in claim 1, wherein the channel estimating means estimates the channels for all of the multi-path components by using the outputs of the adaptive filtering means, and the output of the selecting means for the predetermined number of the pilot symbols expressed as:

$$\begin{bmatrix} \hat{c}_1(n) \\ \vdots \\ \hat{c}_L(n) \end{bmatrix} =$$

-continued $$\begin{bmatrix} 1 & w_1^H(n)s_1(\tau_2-\tau_1) & \dots & w_1^H(n)s_1(\tau_L-\tau_1) \\ \vdots & \vdots & \vdots & \vdots \\ w_L^H(n)s_1(\tau_1-\tau_L) & w_L^H(n)s_1(\tau_2-\tau_L) & \dots & 1 \end{bmatrix}^{-1} \cdot$$

$$\begin{bmatrix} b_1^*(n)w_1^H(n)r_1(n) \\ \vdots \\ b_1^*(n)w_L^H(n)r_L(n) \end{bmatrix}$$

where $s_1(p)$ is a p chip-shifted version of $s_1=[s_{11}\ s_{12} \dots s_{1,N-1}\ s_{1,N}]^T$ that is a normalized spreading code for the first user, p being an arbitrary integer, if p is a positive integer, $s_1(p)=[0_p\ s_{11}\ s_{12} \dots s_{1,N-p}]^T$ and if p is a negative integer, $s_1(p)=[s_{1,-p+1}\ s_{1,-p+2} \dots s_{1,N}\ 0_p]^T$, $0_p$ being a 1×p 0 vector, $(\tau_i-\tau_l)$ being the transmission delay difference between the i-th multi-path component and the l-th multi-path component, which is integer times of a chip.

13. An adaptive RAKE receiving method using at least one constraint in a mobile communication system, the method comprising the steps of:
(a) setting initial coefficients of adaptive filters for multi-path components;
(b) providing each of the adaptive filters with a corresponding multi-path component of a user to perform complex signal filtering;
(c) deciding a channel estimation value for the multi-path component;
(d) generating a reference signal by determining a transmitted data;
(e) calculating an error between the reference signal and the filtered received signal; and
(f) updating the coefficient of the adaptive filters based on a constraint MMSE criterion.

14. The method as recited in claim 13, wherein the step (b) includes the steps of:
(g) gathering each of the multi-path components corresponding to the transmitted signature to provide them to each of the adaptive filters; and
(h) filtering the complex received signal by using the input of the adaptive filter and the coefficient of the adaptive filter.

15. The method as recited in claim 14, wherein the step (b) includes the step of:
(i) compensating transmission delays of the multi-path components and gathering the compensated received signals to provide them to each of the adaptive filters.

16. The method as recited in claim 14, wherein the step (g) includes the step of:
(i) gathering the received signal corresponding to period from a starting chip of a transmitted symbol of the firstly received multi-path component among the multi-path components to a final chip of the transmitted symbol of a last received multi-path component among the multi-path components to provide the gathered signals to each of the adaptive filters.

17. The method as recited in claim 13, wherein the step (c) includes the steps of:
(j) estimating the channel for each of the multi-path components by using a pilot symbol; and
(k) multiplying the complex conjugate value of each of the estimated channel value with the output of the adaptive filter for the corresponding multi-path component, and summing up the multiplied values for all of the multi-path components to decide channel estimation value for the transmitted signal.

18. The method as recited in claim 17, wherein the step (j) includes the step of:
(l) estimating the channel by maximum likelihood combination by using the outputs of the adaptive filters for all the multi-path components and the output of a selecting means.

19. The method as recited in claim 13, wherein the step (d) includes the step of:
(m) deciding a transmitted data; and
(n) generating a reference signal by using the decided data and the channel value.

20. A computer readable recording medium for recording a program for implementing in mobile communication system for providing with an adaptive RAKE receiving apparatus constrained with at least one constraint and having a microprocessor, the functions of:
(a) setting initial coefficients of adaptive filters for multi-path components;
(b) providing each of the adaptive filters with a corresponding multi-path component of a user to perform complex signal filtering;
(c) determining a channel estimation value for the multi-path component;
(d) generating a reference signal by determining a transmitted data;
(e) calculating an error between the reference signal and the filtered received signal; and
(f) updating the coefficient of the adaptive filters based on a constraint MMSE criterion.

* * * * *